(12) United States Patent
Meyer (10) Patent No.: US 8,078,400 B2
(45) Date of Patent: Dec. 13, 2011

(54) ELECTRONIC MAP DISPLAY SYSTEM

(75) Inventor: Hendrik Meyer, Hamburg (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 1179 days.

(21) Appl. No.: 11/779,438

(22) Filed: Jul. 18, 2007

(65) Prior Publication Data
US 2008/0021644 A1 Jan. 24, 2008

(30) Foreign Application Priority Data
Jul. 18, 2006 (EP) .................................. 06014964

(51) Int. Cl.
G08G 1/123 (2006.01)
G01C 21/00 (2006.01)
G06F 19/00 (2006.01)
(52) U.S. Cl. .... 701/211; 701/209; 701/213; 340/995.12
(58) Field of Classification Search .................. 701/211, 701/213, 200, 209; 340/995.12
See application file for complete search history.

(56) References Cited

U.S. PATENT DOCUMENTS

| | | | |
|---|---|---|---|
| 6,115,669 A * | 9/2000 | Watanabe et al. | 701/209 |
| 6,163,749 A | 12/2000 | McDonough et al. | |
| 6,320,518 B2 * | 11/2001 | Saeki et al. | 340/995.12 |
| 6,477,460 B2 * | 11/2002 | Kepler | 701/209 |
| 6,606,558 B2 * | 8/2003 | Hamada et al. | 701/211 |
| 6,674,445 B1 | 1/2004 | Chithambaram et al. | |
| 6,836,724 B2 * | 12/2004 | Becker et al. | 701/200 |
| 6,898,522 B2 | 5/2005 | Buth et al. | |
| 7,002,578 B1 | 2/2006 | Ritter | |

FOREIGN PATENT DOCUMENTS
WO WO 2004/099719 A1 11/2004
* cited by examiner

Primary Examiner — Tan Q. Nguyen
(74) Attorney, Agent, or Firm — The Eclipse Group LLP (57) ABSTRACT

A navigation system is provided that includes a storage unit, a processing unit, and an optical output unit. The storage unit includes a first storage portion for storing type definition data for a plurality of object types, the type definition data defining a graphical representation of an object type in terms of at least one basic geometrical shape. A second storage portion includes object data for a plurality of objects, the object data for an object comprising object type data specifying an object type of the object and object position data specifying an object position of the object. To display an object having a specific object type, the processing unit reads the type definition data of the corresponding object type from the first storage portion and generates graphical representations of the basic geometrical shapes that constitute the object type on the optical output unit.

28 Claims, 6 Drawing Sheets

| OBJECT # | OBJECT TYPE | OBJECT POSITION | SIZE | ALPHANUMERICAL STRING |
|---|---|---|---|---|
| 1 | DIRECTION SIGN | $x_1, y_1$ | $z_1$ | HAMBURG 40 km |
| 2 | TREE | $x_2, y_2$ | $z_2$ | |
| . . . | | | | |

ELECTRONIC MAP DISPLAY SYSTEM

RELATED APPLICATIONS

This application claims priority of European Patent Application Serial Number 06 014 964.8, filed on Jul. 18, 2006, titled METHOD FOR DISPLAYING AN OBJECT ON AN ELECTRONIC MAP AND CORRESPONDING STORAGE UNIT AND NAVIGATION SYSTEM, which application is incorporated by reference in its entirety in this application.

BACKGROUND OF THE INVENTION

1. Field of the Invention

This invention generally relates to electronic maps, and in particular to electronic maps displayed on an optical output unit of a navigation system onboard a vehicle. More particularly, the invention relates to a method of displaying an object on an electronic map as well as a storage unit for storing objects to be displayed on an electronic map and a navigation system including such a storage unit.

2. Related Art

Navigation systems having optical output units, e.g., in the form of a monitor or other display unit, are widely known. Such optical output devices frequently serve to display a portion of a map in order to facilitate information transfer to a user, e.g., a driver of a vehicle, and the provision of driving directions to the user. To improve recognition quality, objects other than roads are frequently also displayed on the optical output unit. Traffic signs, e.g., direction signs and vegetation, e.g., trees, are examples of objects that are displayed on electronic maps of navigation systems. An optical appearance or graphical representation of these objects is frequently stored in a so-called "style database", which stores the full graphical representations of the object to be displayed, e.g., in the form of any suitable graphic data format. This form of storing data related to various objects in the style database allows instances of the respective objects to be readily generated on the electronic map, without much additional processing by a processing unit.

Storage of this type of data in a style database has several disadvantages. For example, different end users frequently desire the same object to be displayed in various different designs. Since many graphical data formats cannot be easily modified so as to accommodate such different designs, frequently, different style databases have to be provided for different end users. A further drawback of several known systems for displaying an object on an electronic map is that if a new object type is introduced or an existing object type is modified, substantial modifications of the style database and/or of the software on which the navigation system operates may be required to appropriately adapt the system to display the new or modified object type.

Therefore, a continued need exists for methods and systems for displaying objects on an electronic map. In particular, there exists a need for a method and system for displaying an object on an electronic map, e.g., in a navigation device, into which new objects can be easily integrated and in which a single database may be used for different end users, while still allowing these different end users to easily integrate their individual design options.

SUMMARY

A method is provided for displaying an object on an electronic map, e.g., in a navigation system. The method comprising the steps of providing a storage unit having a first storage portion and a second storage portion. The first storage portion includes type definition data for a plurality of object types, the type definition data defining a graphical representation of an object type in terms of at least one basic geometrical shape. The second storage portion includes object data for a plurality of objects that are to be displayed, the object data for an object comprising object type data that specifies an object type of the object and object position data that specifies an object position of the object. The method further comprises the steps of retrieving object data including object type data and object position data of an object to be displayed from the second storage portion, retrieving type definition data of the object to be displayed from the first storage portion, where the correct type definition data is specified by the object type data of the object to be displayed, and generating a graphical representation of the at least one basic geometrical shape defined by the type definition data at a position on the electronic map defined by the object position data to generate a graphical representation of the object to be displayed.

A storage unit is also provided for storing data related to a plurality of objects to be displayed on an electronic map. The storage unit includes a first and second storage portion. The first storage portion includes type definition data for a plurality of object types, the type definition data defining a graphical representation of an object type in terms of at least one basic geometrical shape. The second storage portion includes object data for a plurality of objects, the object data for an object comprising object type data specifying an object type of the object and object position data specifying an object position of the object.

This storage unit may be utilized for displaying an object on an electronic map. In particular, the type definition data stored in the first storage portion and the object data stored in the second storage portion may be combined to generate a graphical representation of an object to be displayed. The basic graphical shapes that are used to define an object type in the first storage portion may be selected from a limited number of basic geometrical shapes, e.g., from a group consisting of a line, a triangle, a rectangle, an octagon, and an ellipse and/or a group consisting of a cuboid, a sphere, a pyramid, a cylinder, and a cone.

Additionally, a navigation system is provided that includes an optical output unit, a processing unit, and a storage unit. The storage unit includes a first and second storage portion. The first storage portion includes type definition data for a plurality of object types, the type definition data defining a graphical representation of an object type in terms of at least one basic geometrical shape. The second storage portion includes object data for a plurality of objects, the object data for an object comprising object type data specifying an object type of the object and object position data specifying an object position of the object.

In this example of an implementation of a navigation system, the processing unit is coupled to the storage unit to retrieve object data including object type data and object position data of an object to be displayed from the second storage portion, and to retrieve type definition data of the object to be displayed from the first storage portion, where the correct type definition data is selected based on the object type data of the object to be displayed. The processing unit controls the optical output unit in such a manner that a graphical representation of the object to be displayed is generated by generating a graphical representation of the at least one basic geometrical shape defined by the type definition data. The graphical representation is generated at a position on the optical output unit that is defined by or determined based on the object position data.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
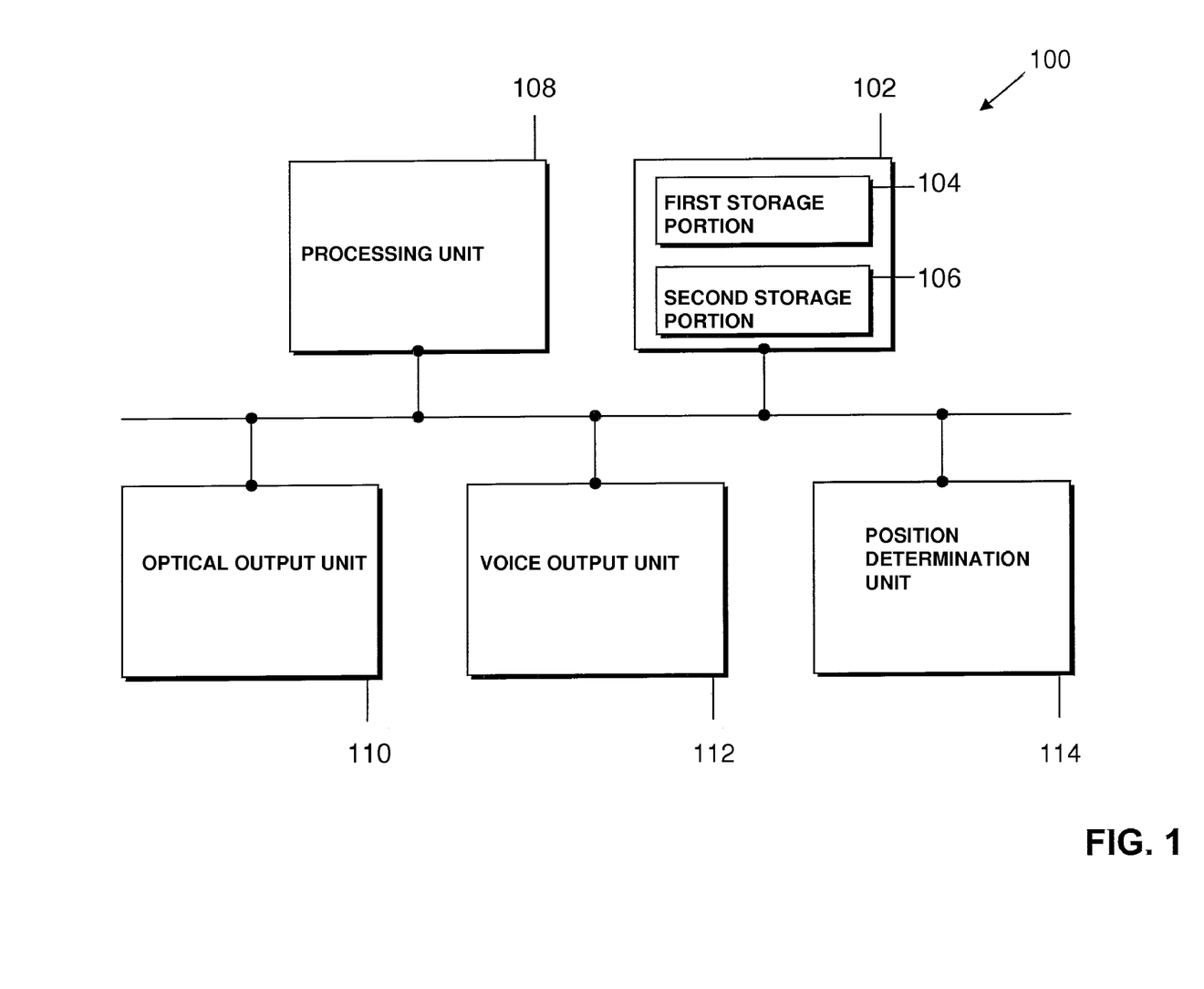
FIG. 1 illustrates one example of an implementation of a schematic diagram of a navigation system.

With reference to FIG. 1, FIG. 1 illustrates one example of an implementation of a schematic diagram of a navigation system 100. As illustrated in FIG. 1, the navigation system 100 includes a storage unit 102, having a first storage portion 104 and a second storage portion 106, a processing unit 108, an optical output unit 110, a voice output unit 112, and a position determination unit 114. The optical output unit 110 may be any known optical output unit, e.g., a monitor or other display unit, a projection device, etc. Similarly, the position determination unit 114 may be any known position determination unit and may include, e.g., a GPS-receiver or gyroscopic devices.

The storage unit 102, which may be, e.g., a CD-ROM, a DVD, a memory card, or a hard disc of a navigation system, may store type definition data for a plurality of different object types in the first storage portion 104 and object data for a plurality of objects to be displayed in the second storage portion 106. While both the type definition data stored in the first storage portion 104 and the object data stored in the second storage portion 106 will be more fully explained below, the type definition data, generally speaking, provides a description for the graphical representation of an object type in terms of one or more basic geometrical shapes. The basic geometrical shapes or "graphical primitives" are typically selected from a small number of elements that are chosen to meet the following requirements. First, the processing unit 108 should be able to easily generate a graphical representation of the respective basic geometrical shape that is displayed by the optical output unit 110. This requirement is readily met by a wide variety of regular geometrical shapes, such as triangles, rectangles, circles, or ellipses, since the generation of a pixelized graphical representation of these elements only requires little computational power. Second, the set of shapes from which the basic geometrical shapes are selected should be chosen in such a way that a wide variety of different object types having different graphical representations may be well approximated by intercombining or superimposing different basic geometrical shapes. For example, the graphical representation of many trees is well approximated by a combination of a cylinder and a sphere or a cylinder and a cone, respectively, so that if three-dimensional vegetation objects are to be displayed, the basic geometrical shapes are preferably selected from a set that includes a cylinder, a sphere and/or a cone.

Since the first storage portion 104 defines a graphical representation of an object type in terms of one basic geometrical shape or a plurality of basic geometrical shapes, and since the processing unit 108 is operative to evaluate this definition and to generate a graphical representation of an object type by generating graphical representations of the corresponding constituent basic geometrical shapes, the definition of object types in terms of basic geometrical shapes or graphical primitives as provided by the first storage portion 104 may be interpreted as an intermediate layer between the storage of data related to objects to be displayed and the generation of a graphical representation of these objects.

Further, while it is sufficient that the processing unit 108 is configured in such a way that it may generate a graphical representation of the basic geometrical shapes on the optical output unit 110, arbitrarily complex graphical representations of object types may be generated by intercombining the graphical representations of the basic geometrical shapes according to the definitions provided by the first storage portion 104. In this regard, the operation of the navigation system 100 may be comparable to metalanguages, such as XML or HTML, run by conventional computers that also allow complex objects to be generated by combining a limited number of fundamental objects, albeit transferred to the field of electronic maps in navigation systems.

In general, since type definition data defines the graphical representation of an object type in terms of one basic geometrical shape or of a plurality of basic geometrical shapes, it is sufficient for a device, such as the navigation system 100 illustrated in FIG. 1, retrieving this data to be capable of displaying the basic geometrical shapes. By combining a larger number of such basic geometrical shapes, an arbitrarily complex geometrical structure may still be represented with sufficient and satisfactory accuracy. Further, new object types can be readily integrated into this system, since their graphical representation may also be defined in terms of the basic geometrical shapes. Still further, when a graphical representation or instance of the at least one basic geometrical shape is generated, the basic geometrical shape may be easily modified, e.g., changed in size and/or orientation, stretched in one or several directions, provided with a surface texture, provided with text to be inserted, or a relative size, relative position or relative orientation of various basic geometrical shapes corresponding to a single object type may be modified etc. Therefore, different design options of different end users can be easily accommodated. Further, the basic geometrical shapes may be arbitrary extended shapes, such as two- or three-dimensional geometrical shapes.

Further, the type definition data of the object to be displayed, or, more generally, the type definition data of a plurality of different object types, may define a graphical representation of the object type in terms of a first and a second basic geometrical shape, and graphical representations of both of these basic geometrical shapes are generated for displaying the object. Further, the type definition data may comprise relative position data specifying a relative position of the first and second basic geometrical shapes, at least one of the graphical representations of the first and second basic geometrical shapes being generated at a position determined based on both the object position data and the relative position data. In other words, when the type definition data defines a graphical representation of the object type in terms of a plurality of basic geometrical shapes, e.g., the first of these basic geometrical shapes may be placed at the position determined by the object position, while the position of the other basic geometrical shapes is determined by adding the relative position to the object position. In another implementation, a relative position is defined for each one of the basic geometrical shapes that specifies a relative position of the respective basic geometrical shape relative to an arbitrary fixed point of the object type, such as its center. In this case, the graphical representations of the individual basic geometrical shapes are generated at positions determined, for each of the basic geometrical shapes, based on the object position data and the relative position data.

As already explained above, in a case in which a graphical representation of an object type is not simply defined by a single basic geometrical shape, but rather by a plurality of basic geometrical shapes, even object types having a complex graphical representation may be well approximated in terms of basic geometrical shapes.

It should be noted that, while some or all object types may be defined in terms of several basic geometrical shapes, the type definition data may also define one or several object types in terms of one basic geometrical shape, only. For example, the object type "street" may be described in terms of a line, and in particular, in terms of a straight line. As previously explained, the graphical representation of an object having object type "street" may still be varied employing modification parameters for modifying the graphical representation of the lines representing streets.

The object data of the object to be displayed may further include at least one modification parameter for modifying an object type, in which case the graphical representation of the at least one basic geometrical shape that is defined by the type definition data is generated based on the modification parameter. The modification parameter or modification parameters may correspond to different quantities, such as a size, an orientation, a line width, a line color, or a surface texture of the basic geometrical shape. Accordingly, the graphical representation of the basic geometrical shape generated on the electronic map may be varied in various ways, e.g., in size, orientation, line width, line color or surface texture. If an object type is composed of several basic geometrical shapes, one or more modification parameters may be provided for specifying a relative position, a relative orientation and/or a relative size of the various basic geometrical shapes. By allowing the various basic geometrical shapes to be modified according to modification parameters, an even wider variety of different object types may be generated.

As previously discussed, the type definition data may define a graphical representation of the object type in terms of the at least one basic geometrical shape and, in addition, a surface texture of at least one surface of the at least one basic geometrical shape. In this case, when a graphical representation of the at least one basic geometrical shape is generated, the at least one surface is filled with the corresponding surface texture. The surface texture may also be provided in the form of a traditional graphics data format, which may, e.g., correspond to a picture taken of a representative of the object type. In one implementation, the basic geometrical shape may be a cuboid and the type definition data define surface textures for side surfaces of the cuboid. For example, for the object type "tree", one or several pictures representing side and top views, respectively, of the tree may be stored and may be used to placard side surfaces of the cuboid.

As already indicated above, the basic geometrical shape or the basic geometrical shapes may be any suitable extended geometrical shapes. In particular, the basic geometrical shapes may be selected from a group consisting of a line, a triangle, a rectangle, an octagon, and an ellipse. The group may further comprise arbitrary polygons. The basic geometrical shapes may also be selected from a group consisting of a cuboid, a sphere, a pyramid, a cylinder, and a cone. In this way, a wide variety of two-dimensional and three-dimensional graphical objects may be displayed.

Since a graphical representation of an object type may again be composed not only of a single basic geometrical shape, but also of a plurality of basic geometrical shapes, the type definition data may correspondingly define a graphical representation of an object type in terms of a first and a second basic geometrical shape, as well as a relative position of the first and second basic geometrical shapes. By inter-combining several basic geometrical shapes to form a graphical representation of an object type, even complex object types may be approximated with sufficient accuracy.

In operation, for each object type, the at least one basic geometrical shape of the type definition data is selected from a set of basic geometrical shapes, and the processing unit 108 is adapted to control the optical output unit 110 so that a graphical representation of each basic geometrical shape of the set of basic geometrical shapes can be generated.

If the storage unit 102 is such that the type definition data define a graphical representation of an object type in terms of a plurality of geometrical shapes, the processing unit 108 controls the optical output unit 110 in such a way that geometrical representations of the plurality of basic geometrical shapes are generated. In this way, a graphical representation of an object having a given object type is generated from graphical representations of the underlying basic geometrical shapes. If the storage unit 102 is such that it comprises at least one modification parameter for modifying an object type, the processing unit 108 controls the optical output unit in such a manner that graphical representations of the at least one basic geometrical shape are modified based on the modification parameter. If the storage unit 102 is such that the type definition data define a graphical representation of the object type in terms of the at least one basic geometrical shape as well as a surface texture for at least one surface of the at least one basic geometrical shape, the processing unit 108 controls the optical output unit 110 in such a manner that a graphical representation of the at least one basic geometrical shape is generated and the at least one surface of the at least one basic geometrical shape is filled with the surface texture.

Figure 2:
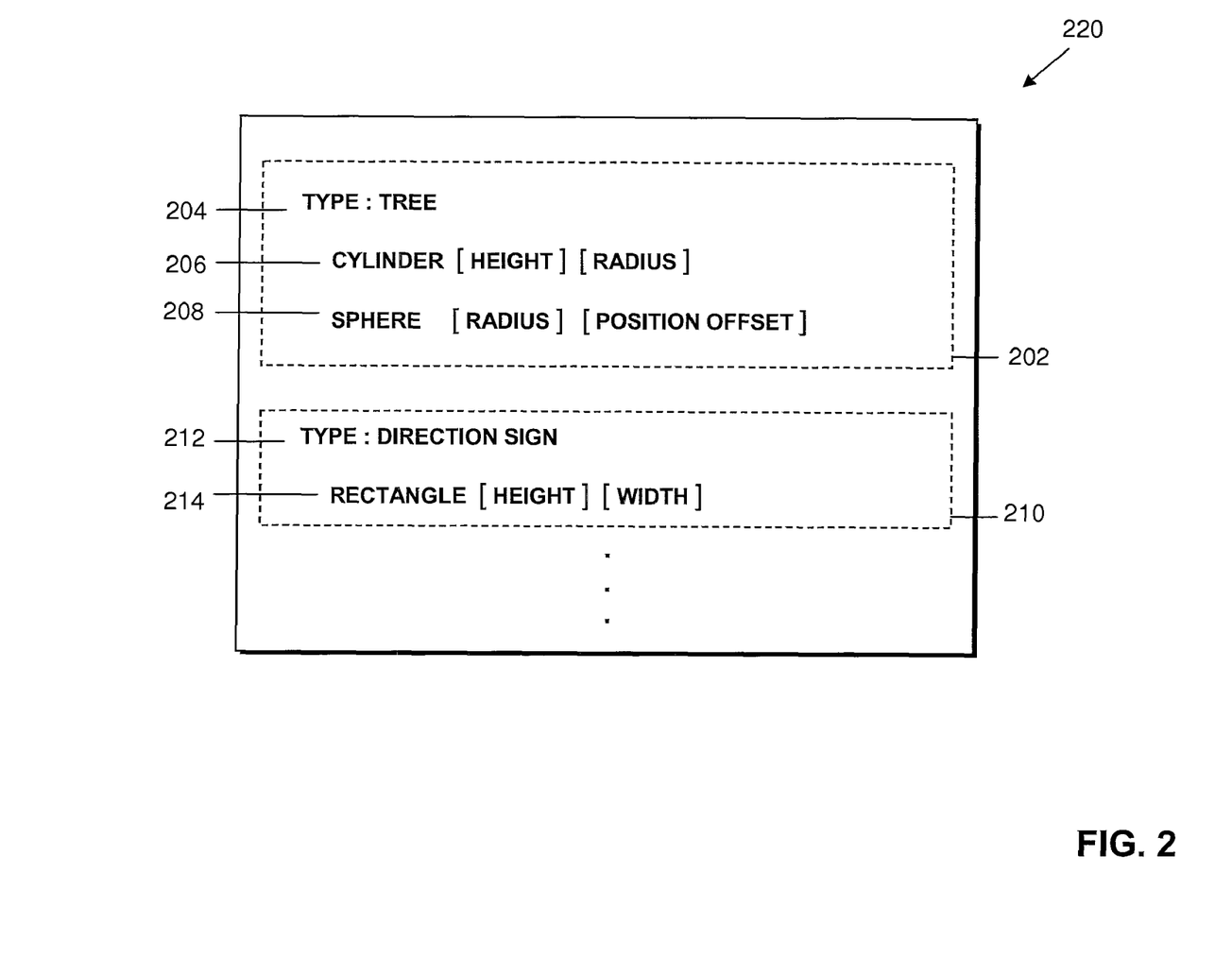
FIG. 2 illustrates a schematic illustration of one example of an implementation of the first storage portion of the storage unit shown in FIG. 1.

FIG. 2 illustrates a schematic illustration of one example of an implementation of the first storage portion 104 of the storage unit 102 shown in FIG. 1. As illustrated in FIG. 2, a first storage portion 200 may contain type definition data for a plurality of object types. For example, as shown in FIG. 2, the first storage portion 200 may contain data related to the object type "tree" and the object type "direction sign", the corresponding type definition data being denoted by 202 and 210, respectively. Turning first to the type definition data 202 for the object type "tree", a type identifier 204 that specifies the object type is followed by a list of basic geometrical shapes, the graphical representation of which in combination reproduces the graphical representation of the object type. Each of the basic geometrical shapes 206 and 208 has associated with it several parameters or attributes that specify, e.g., the size of the constituent basic geometrical shapes, i.e., the height and radius of the cylinder and the radius of the sphere. Further, since the object type tree is composed of two basic geometrical shapes, the position offset between these shapes is an additional parameter that has to be specified.

While it is possible to define the size parameters and the position offset of the different basic geometrical shapes in the type definition data 202, so that a combination of a cylinder and a sphere having the respective parameters represents a generic tree, in one implementation, these parameters may be superseded by parameters specified for individual objects having the object type tree. In other words, if a specific height and radius for the cylinder, radius for the sphere, and position offset between sphere and cylinder is specified for a specific object in the object data, these parameters may supersede the generic parameters defined by the type definition data 202.

Similarly to the type definition data 202, the type definition data 210 for the object type "direction sign" comprises a type identifier 212, specifying the object type, followed by a basic geometrical shape 214, in this case a rectangle, the graphical representation of which represents a graphical representation of the direction sign. The basic geometrical shape rectangle 214 again has parameters specifying the size of the rectangle associated with it. Again, these parameters may preferably be superseded by respective parameters specified for an individual object.

The type definition data 202 and 210 schematically indicated in FIG. 2 are only examples, and other structures for type definition data may be employed as well. For example, both the object type tree and the object type direction sign could be represented by a cuboid, the surfaces of which are provided with an appropriate pattern or surface texture so as to allow a realistic graphical representation of a tree or a direction sign to be obtained by filling the surfaces of the cuboid with the corresponding surface texture. The surface texture may, e.g., be provided or stored in the form of conventional graphical data formats.

While only the basic geometrical shapes cylinder, sphere and rectangle have been employed in the type definition data shown schematically in FIG. 2, the basic geometrical shapes may more generally be selected from a larger group of basic geometrical shapes. For example, the basic geometrical shapes will typically be selected from a group of extended two- and three-dimensional shapes comprising, e.g., a line, a triangle, a rectangle, an octagon, an ellipse, a cuboid, a sphere, a pyramid, a cylinder and a cone. Other suitable choices for the set of basic geometrical shapes are also conceivable.

Figure 3:
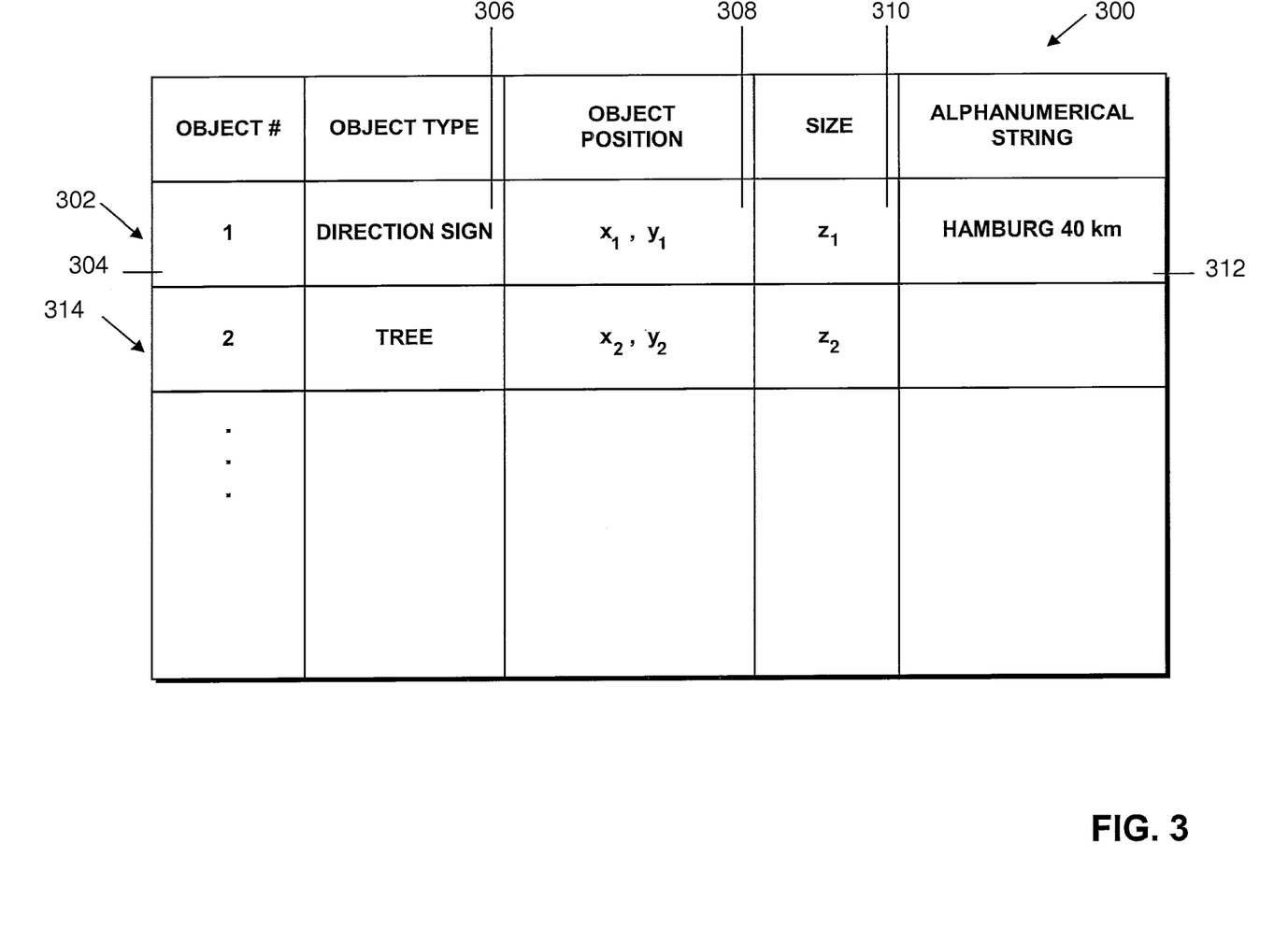
FIG. 3 illustrates a schematic illustration of one example of an implementation of the second storage portion of the storage unit shown in FIG. 1.
Figure 4:
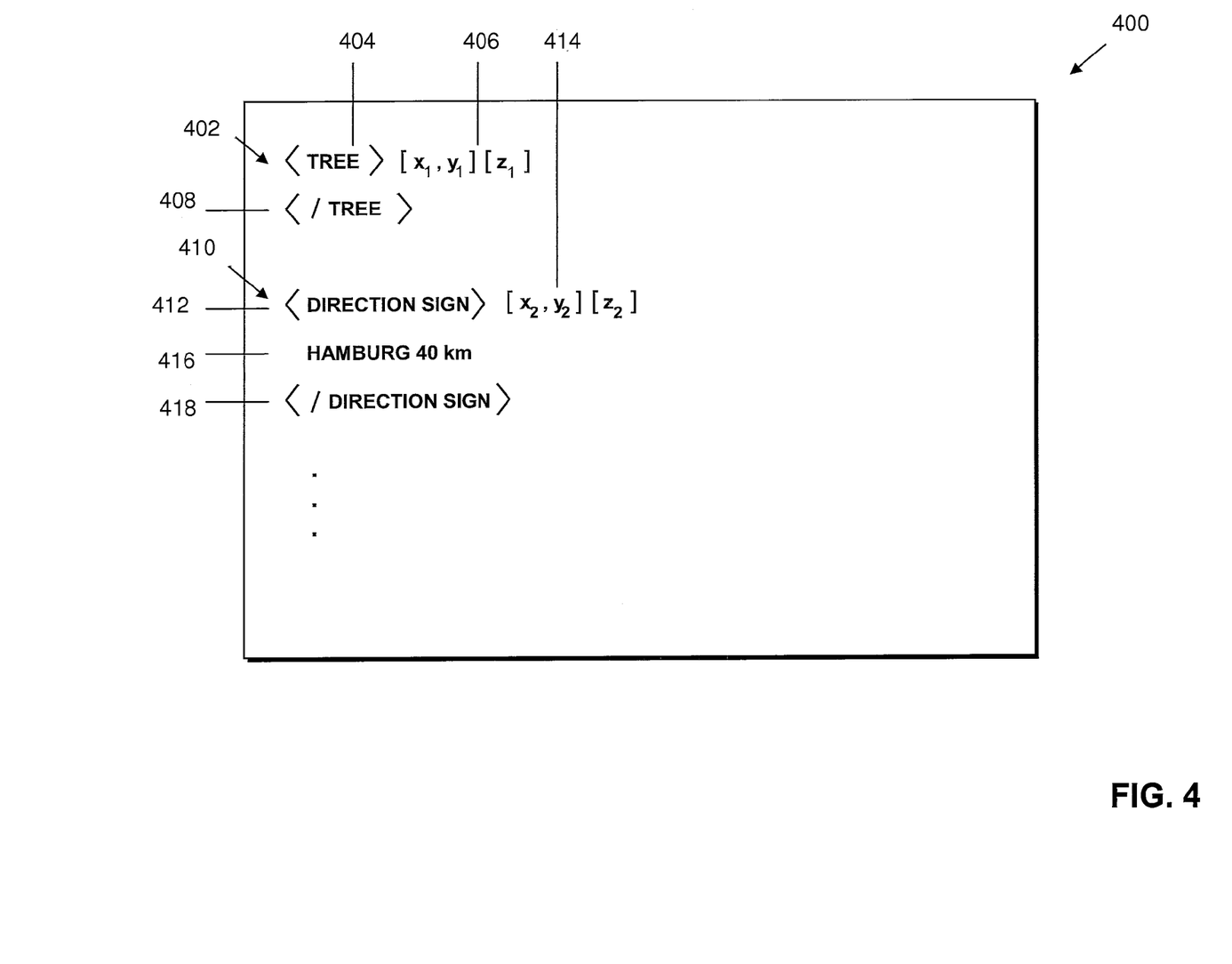
FIG. 4 illustrates a schematic illustration of one example of another implementation of the second storage portion of the storage unit shown in FIG. 1.

Turning now to FIGS. 3 & 4, FIG. 3 illustrates a schematic illustration of one example of an implementation of the second storage portion 104 of the storage unit 102 shown in FIG. 1. FIG. 4 illustrates a schematic illustration of one example of another implementation of the second storage portion 104 of the storage unit 102 shown in FIG. 1.

As previously discussed in connection with FIG. 2, type definition data defines a graphical representation of an object having a given object type in terms of a number of basic geometrical shapes, thus providing instructions on how to generate a graphical representation of an object having a given object type. Contrary to type definition data, object data is stored in a second storage portion 300 and 400, respectively, as illustrated in FIGS. 3 & 4, which contains information on the set of objects that are to be displayed on the electronic map. Since the description on how a graphical representation of a specific object type may be generated is contained in the type definition data stored in the first storage portion 104 and 200, it is sufficient to classify objects according to their object type in the storage portion 300 and 400, in FIGS. 3 & 4, respectively.

As schematically indicated in FIG. 3, the object data in the second storage portion 300 may be organized in the form of a table or data array. In the example data array, two different objects 307 and 314 are listed. In the example shown, each object has an object identifier 304, e.g., in the form of a number. Typically, the object position provides a natural object identifier 304, so that no separate object identifier 304 has to be provided. Further, for each object 307 and 314 at least its object type 306 and its position 308 is also specified. The position 308 may be specified, e.g., in the form of Cartesian coordinates.

Further, in the example shown, the object 302 and 314 may include additional parameters that correspond to a size 310 of the object 302 and 314 and an alphanumerical string 312 which, for the object 302 having an object type 306 "direction sign", is meant for insertion into, and displayed with, the direction sign. In this case, the processing unit 108 (FIG. 1) may control the optical output unit 110 (FIG. 1) in such a manner that the alphanumerical string is inserted into the graphical representation of the geometrical shape. As illustrated, the object to be displayed may be a traffic sign, and the alphanumerical string may represent text to be displayed on the traffic sign.

While only an object size 310 and an alphanumerical string 312 inserted into the object are shown as examples for modification parameters in FIG. 3, the object data may comprise a larger number of modification parameters. For example, assuming that the graphical representation of the object type 306 tree is defined as a composition of a cylinder and a sphere, the object data for an object 302 having object type 306 tree may include a number of parameters that specify the radius and the height of the cylinder, the radius of the sphere, and the relative position of the sphere and the cylinder. By providing such modification parameters, the graphical representation of an object 302, 314 having a specific object type 306 may be varied in a wide variety of ways, although the generic graphical representation of an object 302, 314 having the object type 306 is fully specified by the respective type definition data. By varying the relative size and/or the relative position of the constituent basic geometrical shapes, i.e., the cylinder and the sphere in the case of the tree, the graphical representation of different tree species may be enhanced and/or improved, as well as the recognition quality of the electronic map.

FIG. 4 illustrates a schematic illustration of one example of another implementation of a second storage portion 104 of the storage unit 102 shown in FIG. 1. As already briefly indicated above, the displaying of objects on an electronic map may be related to metalanguages, such as XML or HTLM, among others. Therefore, the object data may also be provided in the form of a textual description rather than the array structure shown in FIG. 3. Similarly to other metalanguages, in the object data of the storage unit 400, each object to be displayed is represented by a pair of tags, an opening tag and a closing tag, sandwiched between which are parameters. In this example, the object data 402 representing an object of the object type tree is in the form of a pair of tags 404, 408, the parameters 406 in between specifying the position and size of the tree. Similarly, for the object data 410 representing an object having object type direction sign, parameters 414 specifying the position and size of the direction sign are provided between the tags 412 and 418. The text 416 to be displayed on the direction sign may also be provided in between the opening tag 412 and the closing tag 418.

As illustrated in FIG. 4, the object data may be provided in the form of a simple textual description, which may provide a large degree or flexibility in use. For example, objects having different object types may require different numbers and types of modification parameters, e.g., for the object type direction sign, a text to be displayed on the direction sign typically is provided. As further illustrated in the simple schematic representation of FIG. 4, different numbers and types of parameters used to modify an object type can be easily accommodated with the textual description of the object data 402, 412. By using the textual description of the object data, the object data may also be easily harnessed also for purposes and functions different from generating graphical representations, as will be more fully appreciated from the description given below with reference to FIG. 6.

Figure 5:
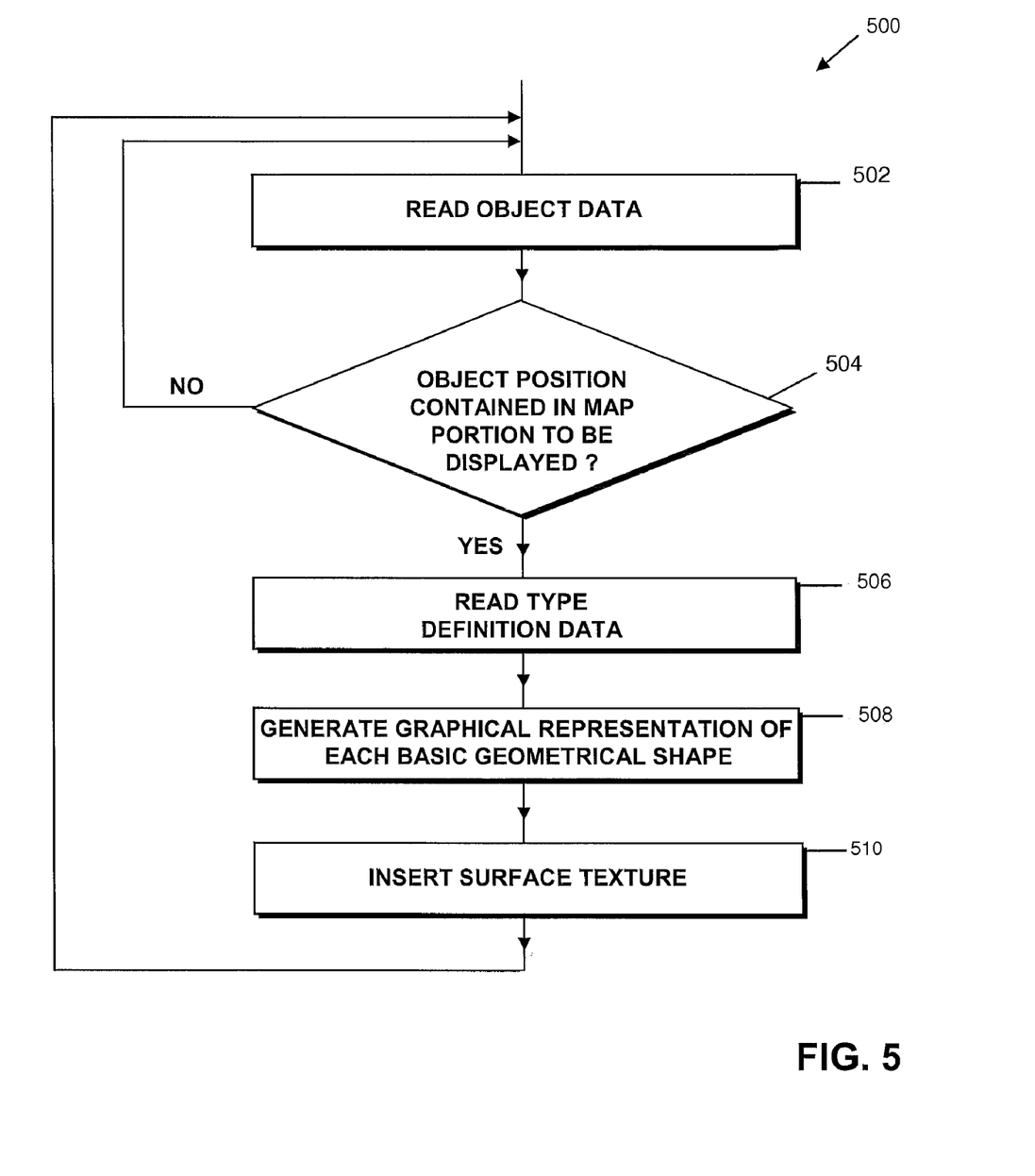
FIG. 5 illustrates a flowchart representing one example of a method of displaying an object on an electronic map using the navigation system illustrated in FIG. 1.

FIG. 5 illustrates a flowchart representing one example of a method of displaying an object on an electronic map using the navigation system 100 illustrated in FIG. 1. The method is generally indicated at 500. At step 502, the processing unit 108 of FIG. 1 reads object data of an object from the second storage portion 106. Although not shown in FIG. 1, the processing unit 108 may comprise an internal working memory unit, or a working memory unit may be coupled to the processing unit 108 for storing object data read from the second storage portion 106. As explained with reference to FIGS. 3 and 4 above, the object data for each object includes, at least, object position data specifying an object position as well as object type data specifying the object type of the object. At step 504, the processing unit 108 determines whether the object position data of the object data read at step 502 corresponds to a position located in the portion of the electronic map that is displayed on the optical output unit 110. If, at step 504, it is determined that the object is not to be displayed on the portion of the electronic map since, e.g., it is located outside of the relevant map portion, the object is discarded and new object data is read. If, however, it is determined that the object is to be displayed on the optical output unit 110, at step 506, the object type is determined from the object type data, and the type definition data corresponding to the thus determined object type is read. Since the type definition data defines a graphical representation of the object type in terms of one basic geometrical shape or a plurality of basic geometrical shapes, at step 508, the processing unit 108 controls the optical output unit 110 in such a manner that graphical representations or instances of each of the basic geometrical shapes determined by the corresponding type definition data are generated, i.e., are displayed by the optical output unit 110. The location at which the graphical representation of each basic geometrical shape is generated will typically be determined in dependence on both the object position specified by the object position data and relative positions of the different basic geometrical shapes constituting the object type. As explained with reference to FIGS. 2-4 above, these relative positions of the various basic geometrical shapes constituting an object type may be specified by the type definition data or as a parameter comprised by the object data. Subsequently, at step 510, the surfaces of the basic geometrical shapes are filled with a surface texture, if provided. In simple embodiments, the surface texture may consist of a regular pattern supplemented by specific color information. For example, for a tree composed of a cylinder and a sphere, the sphere may be provided with a surface texture imitating leaves and being colored in green. Steps 508 and 510 may be merged into a single step. Further, it is not necessary for step 510 to be performed. After step 510, the object data of another object to be displayed may be read in, i.e., steps 502-510 may be iterated.

While steps 502-510 are steps aiming at displaying an object on the optical output unit 110, i.e., at generating a graphical representation of the object, by virtue of the way in which object data is stored in the second storage portion 106, the object data may be harnessed for purposes other than displaying objects after the object has been displayed. For example, if the object is a direction sign or other traffic sign, it may not only be displayed on the optical output unit 100, but the text written on the sign may also be output by a voice output unit 112 (FIG. 1), e.g., after step 510 of FIG. 5.

Figure 6:
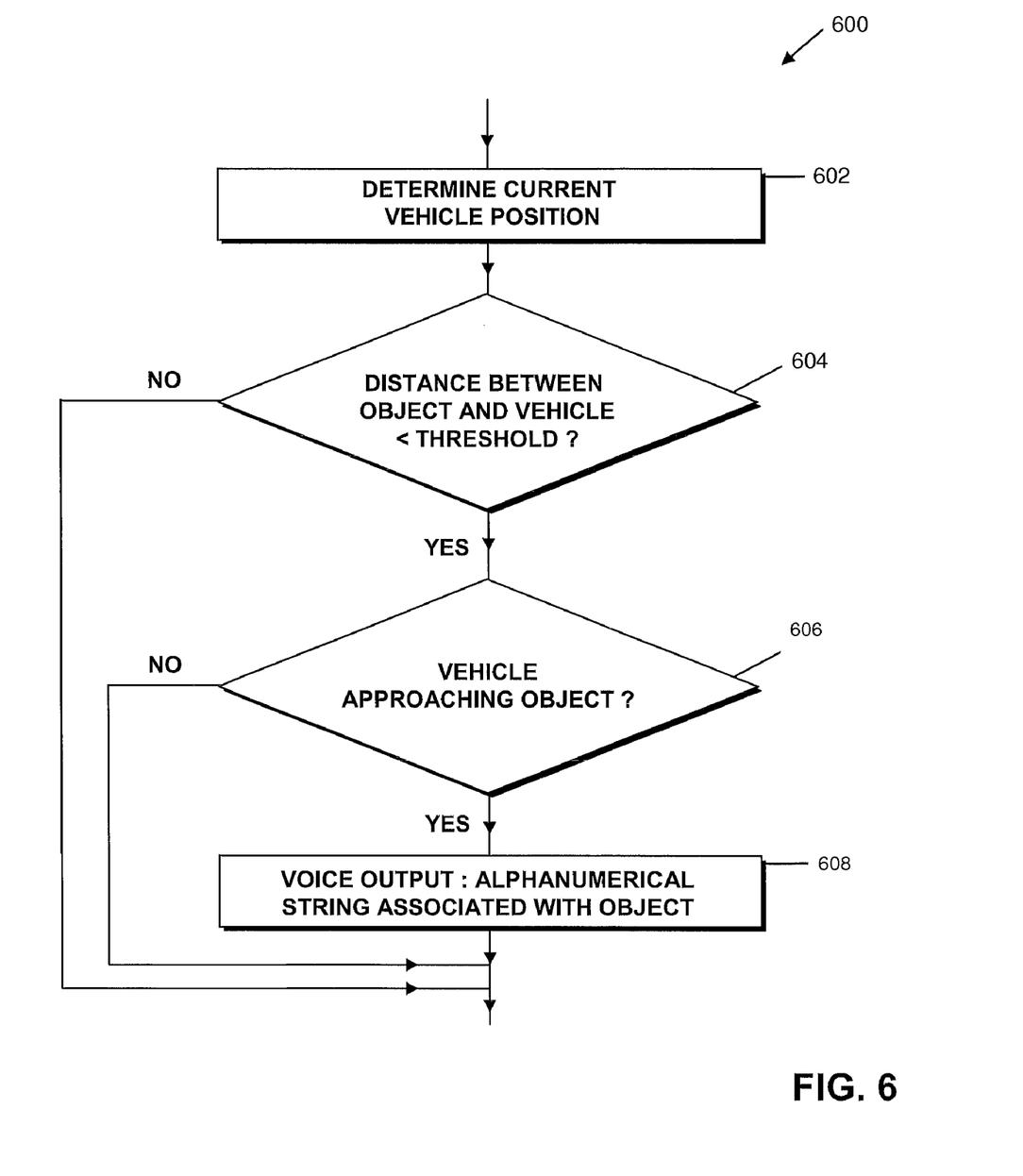
FIG. 6 illustrates a flowchart representing one example of a subroutine of the method show in FIG. 5.

FIG. 6 illustrates a flowchart representing one example of a subroutine of the method show in FIG. 5. With reference to FIG. 6, a subroutine 600 is explained that may be used to implement such a voice output. At step 602, a current vehicle position is determined. In the navigation system 100 shown in FIG. 1, this is achieved by the position determination unit 114, e.g., in the form of a GPS receiver. At step 604, it is determined whether the distance between the vehicle and an object that has an alphanumerical string or text associated with it that is below a predetermined threshold. Alternatively, it may also be determined whether the distance between the object that has an alphanumerical string associated with it and the vehicle lies within a given interval. To ensure that no voice output is generated when the vehicle has already driven past the object, at step 606, it is determined whether the vehicle is approaching the object. Only if the vehicle is determined to be approaching the object, a voice output is generated at step 608. For example, the alphanumerical string that is associated with the object, such as text written on a direction sign, is output via the voice output unit 112. The voice output provides yet another means of alerting a driver of a vehicle of objects that he or she is currently approaching.

Accordingly, the alphanumerical string may also be output via the voice output when a current vehicle position approaches the object position of the corresponding object. Such a voice output is yet a further way of providing information to a vehicle driver, which may be readily combined with the method of displaying an object. In particular, since text to be displayed on, e.g., a traffic sign is stored in the form of an alphanumerical string that is later to be inserted into, e.g., a graphical representation of a generic traffic sign, this alphanumerical string may also be harnessed for other purposes, such as a voice output. Prior to outputting the alphanumerical string via the voice output, it may be processed in any suitable way. For example, if the vehicle is traveling abroad, words or phrases represented by the alphanumerical string may be translated prior to being output via the voice output. More generally, if the object data comprise an alphanumerical string, this alphanumerical string may be harnessed for purposes other than displaying the object. Further, the alphanumerical string may also be further processed prior to being inserted into the graphical representation of the basic geometrical shapes, e.g., by translating the words, by converting numbers representing a distance from kilometers to miles etc.

In above described implementations, since both the type definition data and the object data are stored in the first and second storage portions 104, 106 of the storage unit 102 shown in FIG. 1, existing object types may be easily modified by modifying the corresponding type definition data stored in the first storage portion, or new object types may be added by correspondingly supplementing the first storage portion. As long as the new or modified object type is defined in terms of the same basic geometrical shapes that are used to define all other object types, the processing unit 108 being adapted to generate a graphical representation of these basic geometrical shapes, it is not necessary to modify or update any parts other than the storage unit 102 of the navigation system shown in FIG. 1 to implement the new or modified object types. This results in an increased versatility and flexibility in updating databases for objects to be displayed on electronic maps. Further, since the processing unit 108 only has to be capable of generating graphical representations of a limited number of basic geometrical shapes, the complexity of the instruction code according to which the processing unit 108 operates may be reduced.

The foregoing description of implementations has been presented for purposes of illustration and description. It is not exhaustive and does not limit the claimed inventions to the precise form disclosed. Modifications and variations are possible in light of the above description or may be acquired from practicing the invention. For example, persons skilled in the art will understand and appreciate, that one or more processes, sub-processes, or process steps described in connection with FIGS. 1-6 may be performed by hardware and/or software. Additionally, an electronic display system, as described above, may be implemented in software that would be executed within a processor or plurality of processor in a networked environment. Examples of a processor include but are not limited to microprocessor, general purpose processor, combination of processors, DSP, any logic or decision processing unit regardless of method of operation, instructions execution/system/apparatus/device and/or ASIC. If the process is performed by software, the software may reside in software memory (not shown) in the device used to execute the software. The software in software memory may include an ordered listing of executable instructions for implementing logical functions, i.e., "logic" that may be implemented either in digital form such as digital circuitry or source code or optical circuitry or chemical or biochemical in analog form such as analog circuitry or an analog source such an analog electrical, sound or video signal, and may selectively be embodied in any signal-bearing (such as a machine-readable and/or computer-readable) medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "machine-readable medium," "computer-readable medium," and/or "signal-bearing medium" (hereinafter, "signal-bearing medium") is any means that may contain, store, communicate, propagate, or transport the program for use by or in connection with the instruction execution system, apparatus, or device. The signal-bearing medium may selectively be, for example but not limited to, an electronic, magnetic, optical, electromagnetic, infrared, or semiconductor system, apparatus, device, air, water, or propagation medium. More specific examples, but nonetheless a non-exhaustive list, of computer-readable media would include the following: an electrical connection (electronic) having one or more wires; a portable computer diskette (magnetic); a RAM (electronic); a read-only memory "ROM" (electronic); an erasable programmable read-only memory (EPROM or Flash memory) (electronic); an optical fiber (optical); and a portable compact disc read-only memory "CDROM" "DVD" (optical). Note that the computer-readable medium may even be paper or another suitable medium upon which the program is printed, as the program can be electronically captured, via, for instance, optical scanning of the paper or other medium, then compiled, interpreted or otherwise processed in a suitable manner if necessary, and then stored in a computer memory. Additionally, it is appreciated by those skilled in the art that a signal-bearing medium may include carrier wave signals on propagated signals in telecommunication and/or network distributed systems. These propagated signals may be computer, i.e., machine data signals embodied in the carrier wave signal. The computer/machine data signals may include data or software that is transported or interacts with the carrier wave signal. Note also that the implementation may vary between systems. The claims and their equivalents define the scope of the invention.

What is claimed is:

1. A method of displaying an object on an electronic map, the method providing the steps of:
    providing a storage unit including a first storage portion and a second storage portion, where the first storage portion includes type definition data for a plurality of object types, the type definition data defining a graphical representation of an object type in terms of at least one basic geometrical shape, and where the second storage portion includes object data for a plurality of objects, the object data for an object comprising object type data specifying an object type of the object and object position data specifying an object position of the object;
    retrieving object data including object type data and object position data of an object to be displayed from the second storage portion;
    retrieving type definition data of the object to be displayed from the first storage portion based on the object type data of the object to be displayed; and
    generating a graphical representation of the object to be displayed by generating a graphical representation of the at least one basic geometrical shape defined by the type definition data at a position on the electronic map determined based on the object position data.

2. The method of claim 1, where the type definition data of the object to be displayed defines a graphical representation of the object type in terms of a first basic geometrical shape and a second basic geometrical shape and where the step of generating a graphical representation further includes generating a graphical representation of the first basic geometrical shape and generating a graphical representation of the second basic geometrical shape.

3. The method of claim 2, where the type definition data further includes relative position data specifying a relative position of the first basic geometrical shape and the second basic geometrical shape, and the graphical representation of the first basic geometrical shape and the graphical representation of the second basic geometrical shape are generated at positions determined based on the object position data and the relative position data.

4. The method of claim 1, where the object data of the object to be displayed further comprise at least one modification parameter for modifying an object type, where the graphical representation of the at least one basic geometrical shape specified by the type definition data is generated based on the at least one modification parameter.

5. The method of claim 4, where the at least one modification parameter is selected from a group consisting of: a size, an orientation, a line width, a line color, and a surface texture of the at least one basic geometrical shape.

6. The method of claim 1, where the type definition data defines a graphical representation of the object type in terms of the at least one basic geometrical shape and a surface texture for at least one surface of the at least one basic geometrical shape, the method further comprising the step of filling the at least one surface of the at least one basic geometrical shape with the surface texture.

7. The method of claim 6, where the at least one basic geometrical shape is a cuboid and the type definition data define a surface texture for side surfaces of the cuboid.

8. The method of claim 1, where the object data of the object to be displayed further includes at least one alphanumerical string, and the method further comprises the step of inserting the alphanumerical string into the graphical representation of the at least one basic geometrical shape.

9. The method of claim 8, where the object to be displayed is a traffic sign and the alphanumerical string represents text to be displayed on the traffic sign.

10. The method of claim 8, further comprising the step of outputting the alphanumerical string via a voice output.

11. The method of claim 10, the electronic map is part of a navigation system of a vehicle and where the method further comprises the step of determining a current vehicle position and where the alphanumerical string is output via the voice output when the current vehicle position approaches the object position of the object to be displayed.

12. The method of claim 1, where the basic geometrical shape is selected from a group consisting of a line, a triangle, a rectangle, an octagon, and an ellipse.

13. The method of claim 1, where the basic geometrical shape is selected from a group consisting of a cuboid, a sphere, a pyramid, a cylinder, and a cone.

14. A navigation system comprising:
an optical output unit;
a processing unit;
a storage unit having a first storage portion and a second storage portion;
the first storage portion including type definition data for a plurality of object types, the type definition data defining a graphical representation of an object type in terms of at least one basic geometrical shape;
the second storage portion including object data for a plurality of objects, the object data for an object comprising object type data specifying an object type of the object and object position data specifying an object position of the object;
the processing unit is coupled to the storage unit to retrieve object data including object type data and object position data of an object to be displayed from the second storage portion and type definition data of the object to be displayed from the first storage portion, based on the object type data of the object to be displayed; and
where the processing unit controls the optical output unit so that a graphical representation of the at least one basic geometrical shape defined by the type definition data is generated at a position on the optical output unit defined by the object position data.

15. A storage unit storing a plurality of objects to be displayed on an electronic map, the storage unit comprising:
a first storage portion that includes type definition data for a plurality of object types, the type definition data defining a graphical representation of an object type in terms of at least one basic geometrical shape; and
a second storage portion that includes object data for a plurality of objects, the object data for an object comprising object type data specifying an object type of the object and object position data specifying an object position of the object.

16. The storage unit of claim 15, where the type definition data defines a graphical representation of an object type in terms of a first basic geometrical shape, a second basic geometrical shape, and a relative position of the first and second basic geometrical shapes.

17. The storage unit of claim 15, where the object data for an object further includes at least one modification parameter for modifying an object type, which modification parameter is selected from a group consisting of a size, an orientation, a line width, a line color, and a surface texture of the at least one basic geometrical shape of the object type.

18. The storage unit of claim 15, where the type definition data defines a graphical representation of the object type in terms of the at least one basic geometrical shape and a surface texture for at least one surface of the at least one basic geometrical shape.

19. The navigation system of claim 14, where the navigation system performs the method of claim 1.

20. The navigation system of claim 14, where for each object type, the at least one basic geometrical shape of the type definition data is selected from a set of basic geometrical shapes, and the processing unit is adapted to control the optical output unit so that a graphical representation of each basic geometrical shape of the set of basic geometrical shapes can be generated on the optical output unit.

21. The navigation system of claim 20, where the type definition data in the first storage portion of the storage unit defines a graphical representation of an object type in terms of a first basic geometrical shape, a second basic geometrical shape, and a relative position of the first and second basic geometrical shapes, and the processing unit controls the optical output unit so that graphical representations of the first basic geometrical shape and the second basic geometrical shape are generated at positions on the optical output unit determined based on the object position data and the relative position of the first and second basic geometrical shapes.

22. The navigation system of claim 20, where the object data for an object in the second storage portion of the storage unit further includes at least one modification parameter for modifying an object type, which modification parameter is selected from a group consisting of a size, an orientation, a line width, a line color, and a surface texture of the at least one basic geometrical shape of the object types, and the processing unit controls the optical output unit so that the graphical representation of the at least one basic geometrical shape defined by the type definition data is modified based on the modification parameter.

23. The navigation system of claim 14, where the type definition data in the first storage portion of the storage unit defines a graphical representation of the object type in terms of the at least one basic geometrical shape and a surface texture for at least one surface of the at least one basic geometrical shape, and the processing unit controls the optical output unit so that a graphical representation of the at least one basic geometrical shape is generated and the at least one surface of the at least one basic geometrical shape is filled with the surface texture.

24. The navigation system of claim 14, where the object data of the object to be displayed further includes an alphanumerical string, and the processing unit controls the optical output unit so that the alphanumerical string is inserted into the graphical representation of the at least one basic geometrical shape.

25. The navigation system of claim 24, where the object to be displayed is a traffic sign and the alphanumerical string represents text to be displayed on the traffic sign.

26. The navigation system of claim 24, further comprising a voice output unit, where the alphanumerical string is output via the voice output unit.

27. The navigation system of claim 26, where the navigation system is a vehicle navigation system and the navigation system further comprises a position determination unit for determining the current vehicle position.

28. The navigation system of claim 27, where the alphanumerical string is output via the voice output unit when the current vehicle position approaches the object position of the object to be displayed.

* * * * *